(12) United States Patent  (10) Patent No.: US 7,698,881 B2
McCane et al.  (45) Date of Patent: Apr. 20, 2010

(54) WALK-BEHIND MOWER CONTROL SYSTEM AND METHOD

(75) Inventors: Stephen B. McCane, McDonough, GA (US); Stephen C. Price, Barnsville, GA (US)

(73) Assignee: Briggs and Stratton Corporation, Wauwatosa, WI (US)

( * ) Notice: Subject to any disclaimer, the term of this patent is extended or adjusted under 35 U.S.C. 154(b) by 21 days.

(21) Appl. No.: 12/209,498

(22) Filed: Sep. 12, 2008

(65) Prior Publication Data

US 2010/0064650 A1 Mar. 18, 2010

(51) Int. Cl.
*A01D 69/00* (2006.01)

(52) U.S. Cl. ...................................................... 56/10.8

(58) Field of Classification Search .............. 56/10.2 R, 56/10.5, 10.8, 11.3, 11.7, 11.8, 16.7; 74/500.5, 74/501.5 R, 501.6, 502.2, 483 R; 200/600, 200/86 R See application file for complete search history.

(56) References Cited

U.S. PATENT DOCUMENTS

| 2,523,439 | A | | 9/1950 | May |
| 2,960,886 | A | | 11/1960 | Cunningham |
| 3,028,717 | A | | 4/1962 | West |
| 3,142,950 | A | | 8/1964 | West |
| 3,230,695 | A | | 1/1966 | West |
| 3,481,123 | A | | 12/1969 | Lessig, III |
| 3,903,679 | A | | 9/1975 | Sorenson et al. |
| 3,980,068 | A | * | 9/1976 | Karsten et al. ......... 123/198 DC |
| 4,270,032 | A | * | 5/1981 | Dobberpuhl ............. 200/61.85 |
| 4,481,757 | A | | 11/1984 | Tsuchiya |
| 4,738,084 | A | | 4/1988 | Ogano et al. |
| 4,753,062 | A | * | 6/1988 | Roelle ......................... 56/10.5 |
| 4,833,935 | A | | 5/1989 | Roelle |
| 5,020,308 | A | | 6/1991 | Braun et al. |
| 5,297,379 | A | | 3/1994 | Smith |
| 7,414,412 | B2 | * | 8/2008 | Berkeley ..................... 324/658 |
| 7,591,126 | B2 | * | 9/2009 | Cox ........................... 56/10.8 |
| 2006/0048979 | A1 | | 3/2006 | Johansson et al. |

* cited by examiner

*Primary Examiner*—Robert E Pezzuto
(74) *Attorney, Agent, or Firm*—Greenberg Traurig, LLP

(57) ABSTRACT

Embodiments of the invention provide a control assembly and method of manufacturing a walk-behind mower having a transmission and an engine electrically connected to an operator presence switch. The control assembly can include a left drive lever and a right drive lever. The control assembly can also include a left control member and a right control member each coupled to the transmission. The control assembly can further include a left operator presence lever and a right operator presence lever coupled to the operator presence switch. The operator presence switch can allow the engine to operate when either the left operator presence lever is moved toward the left drive lever or the right operator presence lever is moved toward the right drive lever.

20 Claims, 9 Drawing Sheets

US 7,698,881 B2

WALK-BEHIND MOWER CONTROL SYSTEM AND METHOD

BACKGROUND

Walk-behind mowers generally include a handle and an operator presence bar that must be squeezed together with the handle in order to start and operate the mower. The operator presence bar often spans the horizontal width of the mower. In addition, typical walk-behind mowers include a separate speed control lever that must be accessed by one of the operator's hands while the operator continues to squeeze the operator presence bar against the handle with his or her other hand. If the operator accidentally releases the operator presence bar with one hand while using the other hand to reach the speed control lever, the engine of the mower will automatically shut down causing the operator the delay in having to re-start the engine.

SUMMARY

Some embodiments of the invention provide a control assembly for use with a walk-behind mower having a transmission and an engine electrically connected to an operator presence switch. The control assembly can include a left drive lever and a right drive lever. The control assembly can also include a left control member and a right control member. The left control member can be coupled to the left drive lever, and the right control member can be coupled to the right drive lever. The left control member and the right control member can each be coupled to the transmission. The control assembly can further include a left operator presence lever and a right operator presence lever. The left operator presence lever can be moveable toward the left drive lever, and the right operator presence lever can be moveable toward the right drive lever. The left operator presence lever and the right operator presence lever can each be coupled to the operator presence switch electrically connected to the engine. The operator presence switch can allow the engine to operate when the left operator presence lever is moved toward the left drive lever or when the right operator presence lever is moved toward the right drive lever.

DETAILED DESCRIPTION

Figure 1:
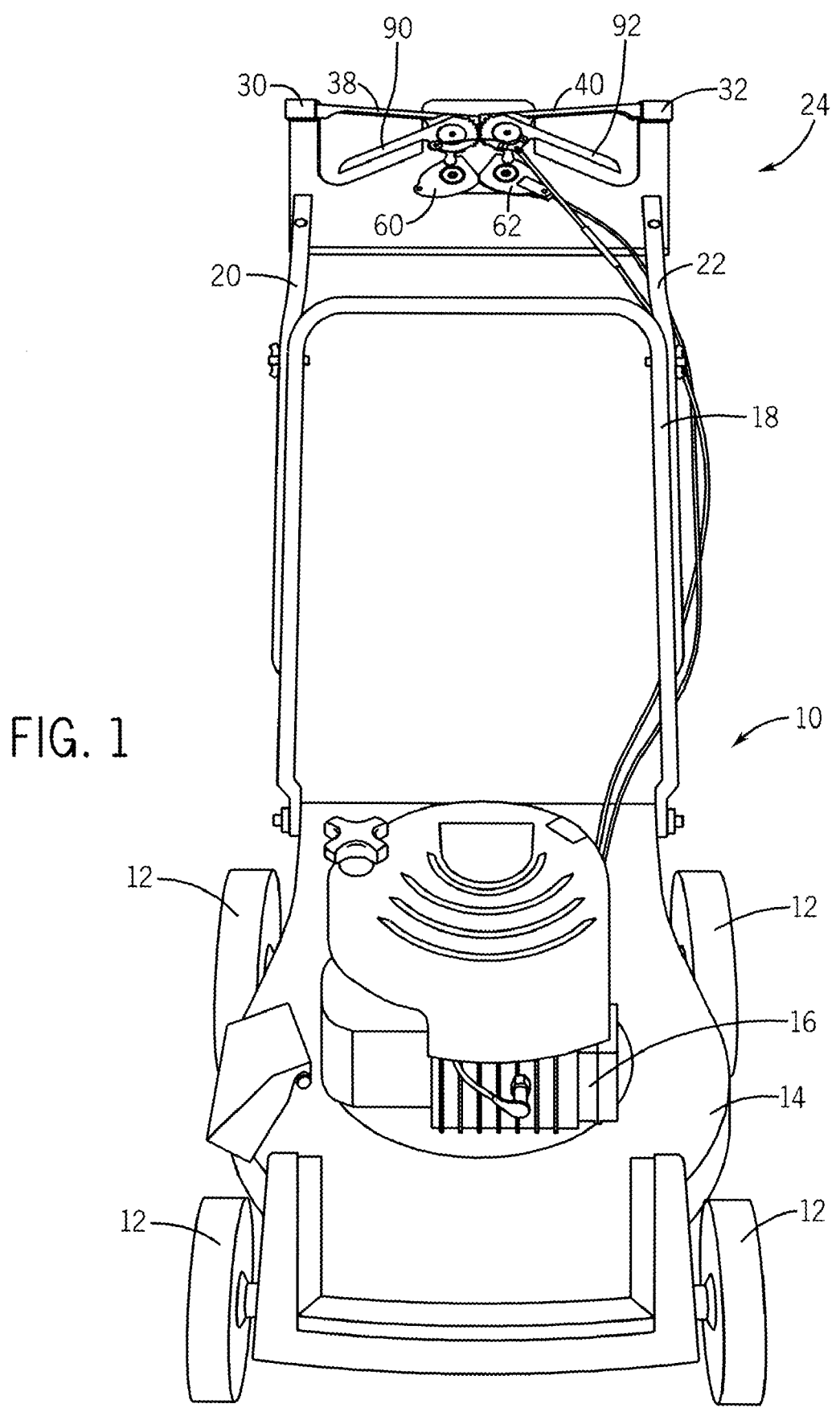
FIG. 1 is a perspective view of a walk-behind mower according to one embodiment of the invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings, whether mechanical or electrical. Further, "connected" and "coupled" are not restricted to physical or mechanical or electrical connections or couplings.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

FIG. 1 illustrates a walk-behind mower 10 according to one embodiment of the invention. The walk-behind mower 10 can include wheels 12, a cutting deck 14, an engine 16, a handle support assembly 18, and a control assembly 24. The control assembly 24 of some embodiments of the invention can also be used with other walk-behind equipment, such as snow blowers, garden tillers, brush mowers, etc. The engine 16 can be electrically connected to an operator presence switch (not shown). In some embodiments, the operator presence switch can be a mechanical switch that is electrically connected to the engine 16. An upper portion of the handle support assembly 18 can include a right arm 20 and a left arm 22.

Figure 2:
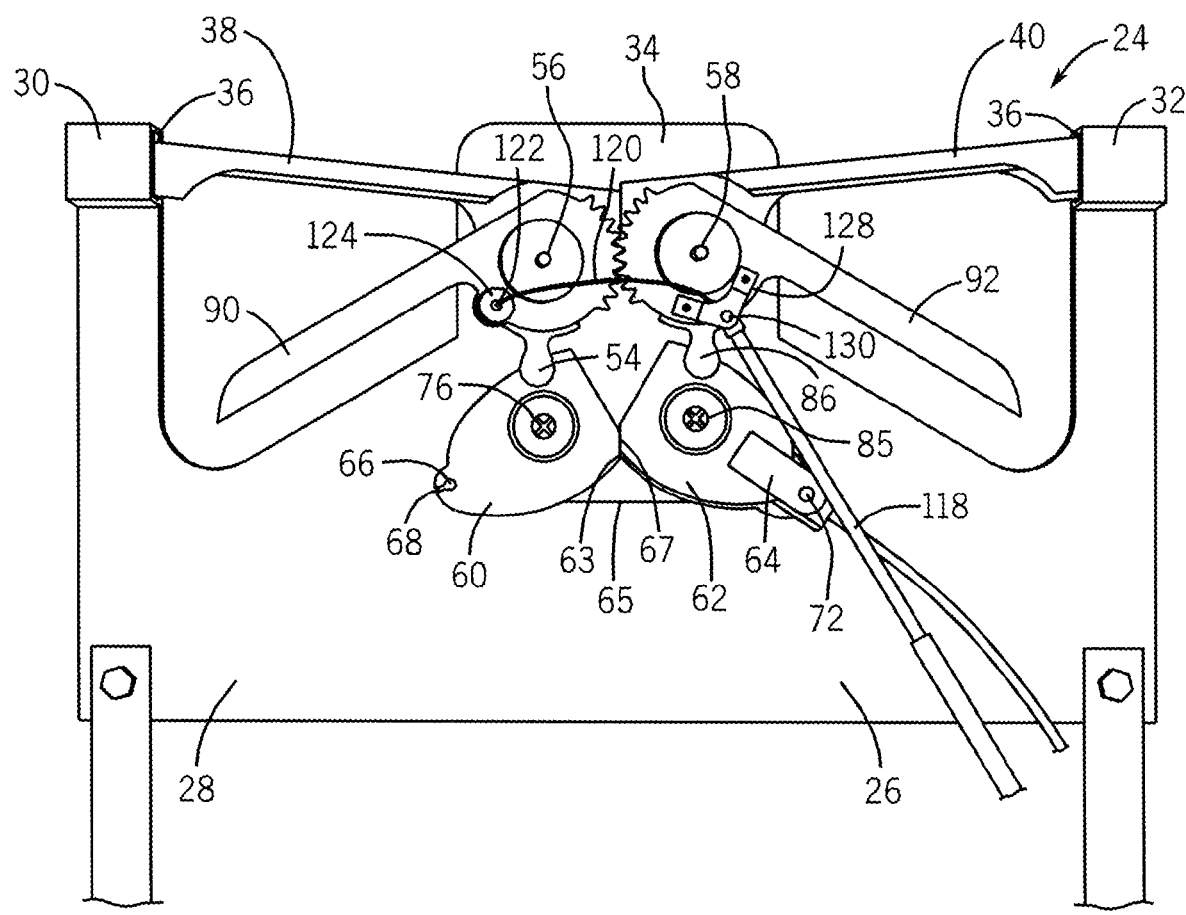
FIG. 2 is a perspective view of a control assembly for use with the walk-behind mower of FIG. 1.
Figure 3:
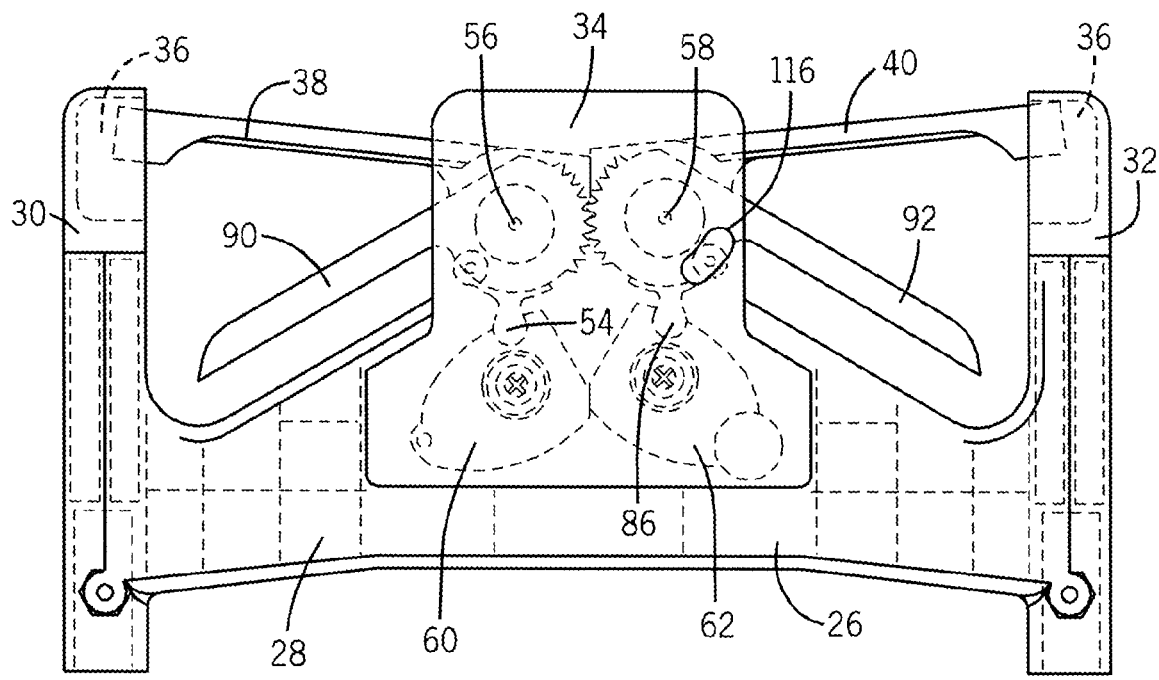
FIG. 3 is a front cross-sectional view of the control assembly of FIG. 2.

FIGS. 2 and 3 illustrate the control assembly 24 according to one embodiment of the invention. The control assembly 24 can include a control panel 26 coupled to the right arm 20 and the left arm 22 of the handle support assembly 18. In some embodiments, the control panel 26 can be a generally flat panel including a base plate 28, a right lever support member 30, a left lever support member 32, and a pivot support member 34. In some embodiments, the right lever support member 30 and the left lever support member 32 can each include a drive lever receiving aperture 36.

Figure 8:
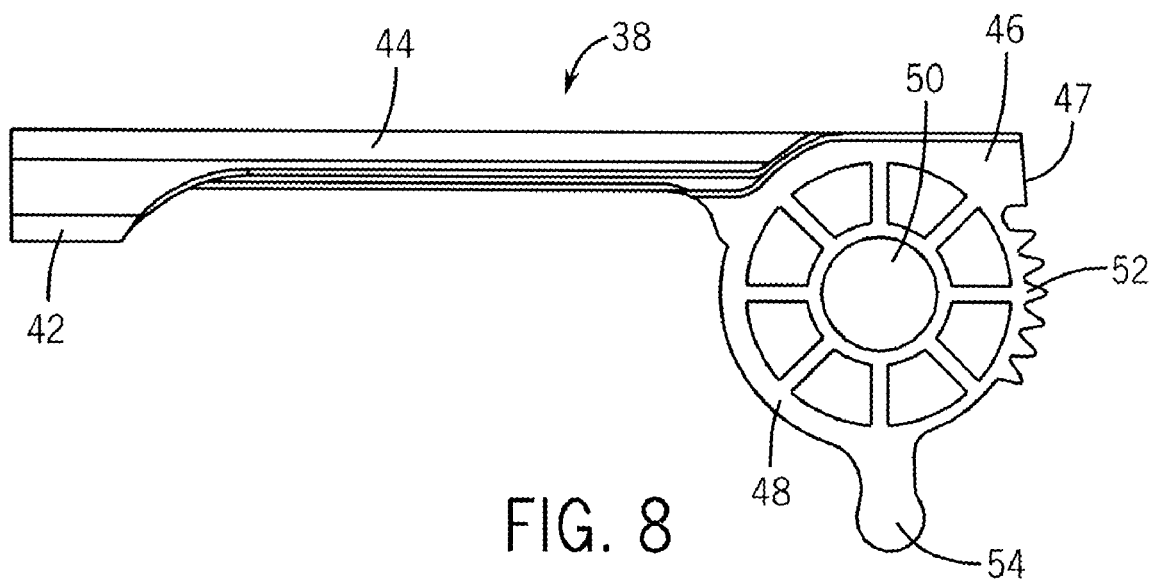
FIG. 8 is a front view of a drive lever for use with the control assembly of FIG. 1.

The control assembly 24 can include a right drive lever 38 and a left drive lever 40. An end of each of the right drive lever 38 and the left drive lever 40 can be received within the drive lever receiving apertures 36 in order to protect the drive levers during shipping, transfer, and storage of the mower 10. The right drive lever 38 and the left drive lever 40 can be substantially the same, with the right drive lever 38 being shown by way of example in FIG. 8. The right drive lever 38 can include a first end 42, a grip 44, a second end 46, and a pivot plate 48. The first end 42 can be received by the drive lever receiving aperture 36 in order to protect the grip 44 from being broken from the pivot plate 48. The second end 46 can include a flat stop portion 47 (as shown in FIG. 8) that can engage a corresponding flat stop portion of the left drive lever 40 (as shown in FIG. 2) in order to prevent the drive levers 38 and 40 from being pulled too far backward toward the operator of the mower 10. As shown in FIG. 8, the pivot plate 48 can include a pivot aperture 50, a geared portion 52, and a lobe 54. As shown in FIG. 2, the pivot aperture 50 can receive a first right axle 56. Similarly, the left drive lever 40 can receive a first left axle 58. In some embodiments, the geared portion 52 of the right drive lever 38 can engage a similar geared portion of the left drive lever 40.

Figure 11:
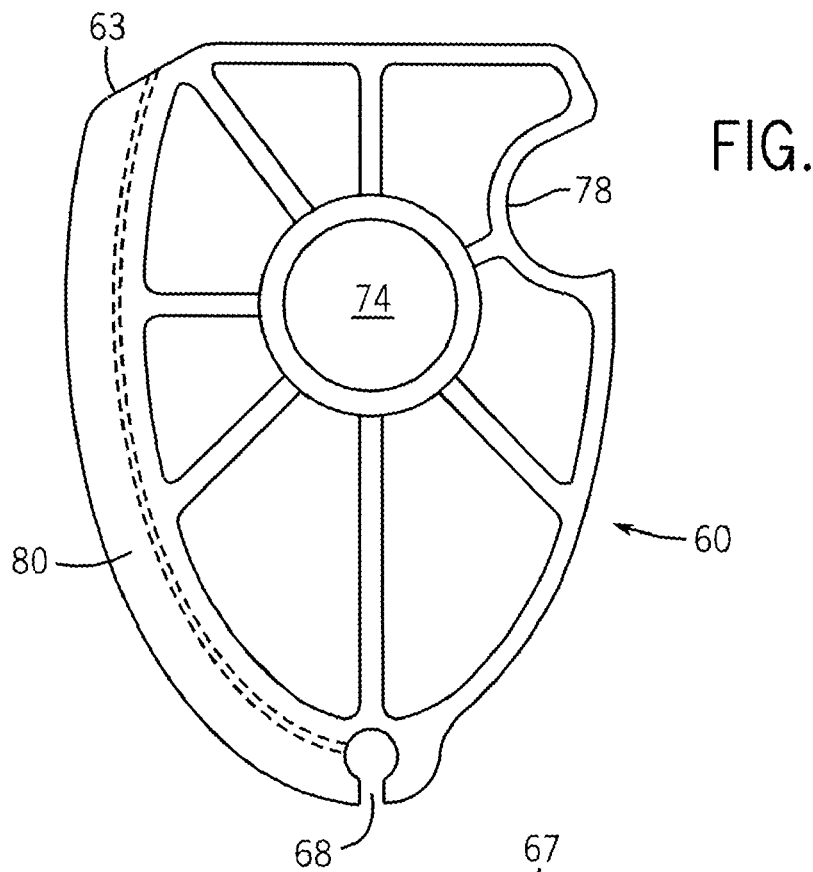
FIG. 11 is a cross-sectional view of a right control member for use with the control assembly of FIG. 1.
Figure 12:
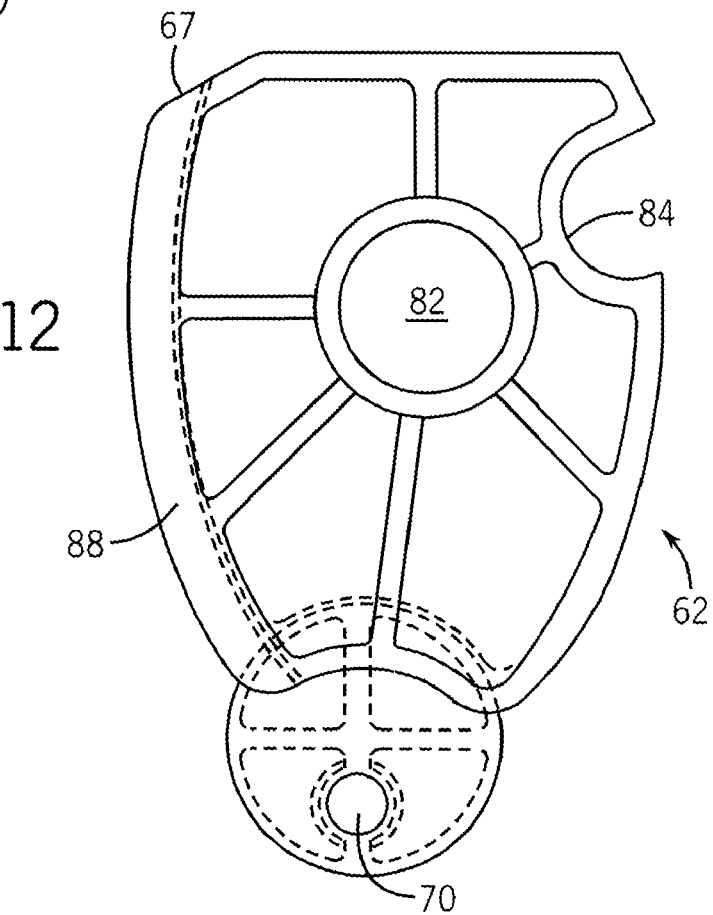
FIG. 12 is a cross-sectional view of a left control member for use with the control assembly of FIG. 1.
Figure 13:
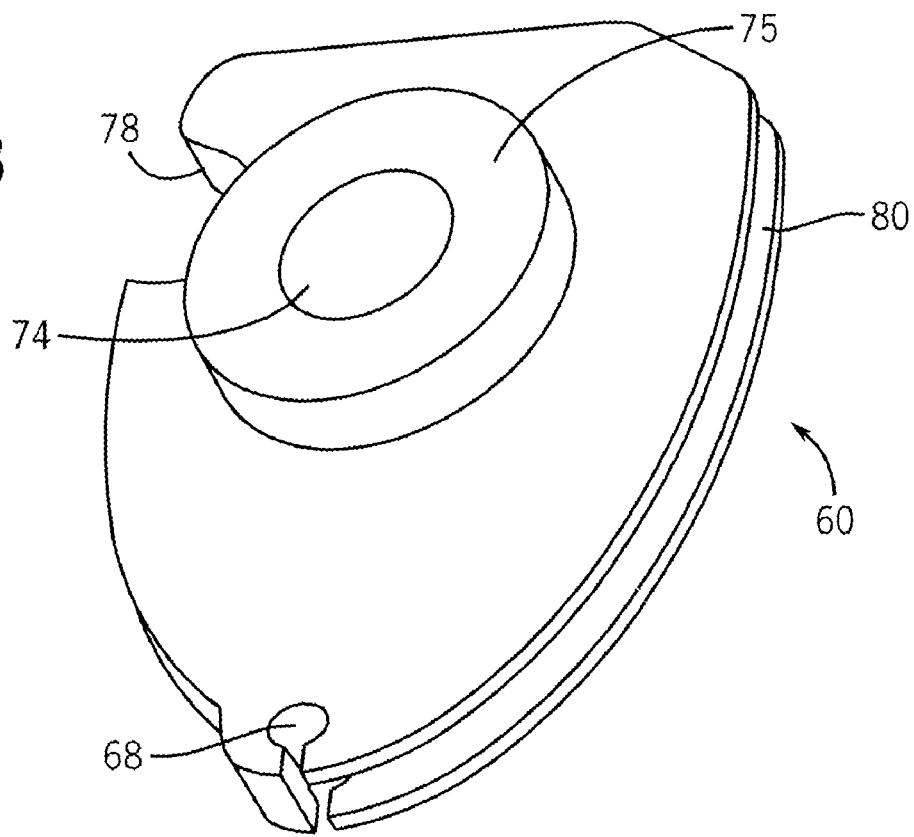
FIG. 13 is a perspective view of the right control member of FIG. 11.

As shown in FIGS. 2 and 3, the control assembly 24 can also include a right control member 60 and a left control member 62. The lobe 54 of the right drive lever 38 can be used to couple the right drive lever 38 to the right control member 60. The right control member 60 can be used to transfer the movement of the right drive lever 38 to a transmission linkage 64 (e.g., a cable linkage to the transmission). Similarly, the left control member 62 can be coupled to the left drive lever 40. The left control member 62 can be used to transfer the movement of the left drive lever 40 to the transmission linkage 64. As shown in FIG. 2, the transmission linkage 64 can include a cable 65 having a first end 66 coupled to a cable aperture 68 in the right control member 60. The cable 65 can extend between the right control member 60 and the left control member 62. The cable 65 can then be coupled through a cable aperture 70 in the left control member 62 (as shown in FIG. 12) and to a bracket 72 (as shown in FIG. 2). The bracket 72 can be used to couple the remainder of the cable 65 to the transmission. As shown in FIGS. 2, 11, and 13, the right control member 60 can include a right stop portion 63 that can engage a left stop portion 67 on the left control member 62 in order to prevent the right control member 60 and the left control member 62 from rotating beyond a particular position.

As shown in FIGS. 11 and 13, the right control member 60 can include the cable aperture 68 and a pivot aperture 74. In some embodiments, as shown in FIG. 13, the pivot aperture 74 can be surrounded by a boss portion 75. As shown in FIGS. 2, 11, and 13, the pivot aperture 74 can receive a second right axle 76. As also shown in FIGS. 11 and 13, the right control member 60 can include a lobe-receiving recess 78. As further shown in FIGS. 11 and 13, the right control member 60 can include a channel 80 that can receive and guide the cable 65.

Figure 14:
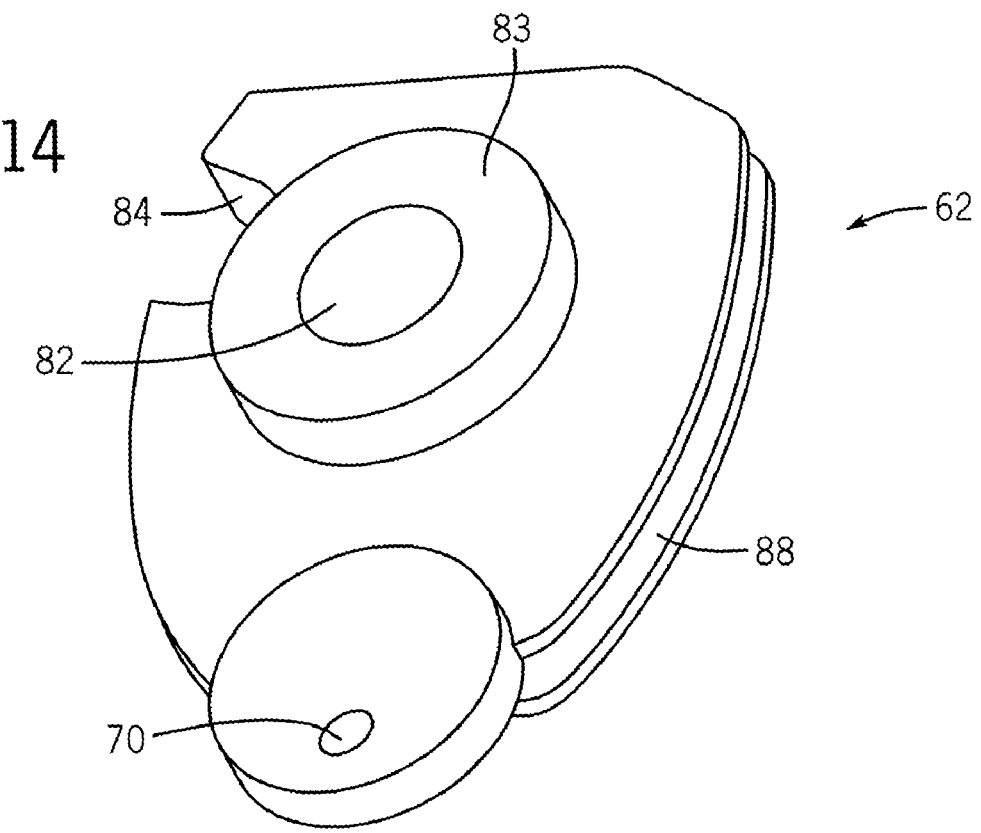
FIG. 14 is a perspective view of the left control member of FIG. 12.

As shown in FIGS. 2, 12, and 14, the left control member 62 can include the cable aperture 70 and a pivot aperture 82 that can receive a second left axle 85. In some embodiments, as shown in FIG. 14, the pivot aperture 82 can be surrounded by a boss portion 83. As also shown in FIGS. 2, 12, and 14, the left control member 62 can include a lobe-receiving aperture 84 to receive a lobe 86 of the left drive lever 40. As further shown in FIGS. 12 and 14, the left control member 62 can also include a channel 88 that can receive and guide the cable 65.

As shown in FIGS. 2 and 3, the control assembly 24 can include a right operator presence lever 90 and a left operator presence lever 92. The right operator presence lever 90 can be moveable toward the right drive lever 38, and the left operator presence lever 92 can be moveable toward the left drive lever 40. The right operator presence lever 90 and the left operator presence lever 92 can each be coupled to the operator presence switch that is electrically connected to the engine 16. In some embodiments, the operator presence switch can be a power cut-off switch to the ignition of the engine 16. In some embodiments, the right operator presence lever 90 and the left operator presence lever 92 are each individually coupled to the operator presence switch and are coupled to each other through a geared teeth arrangement. In this manner, only one of the right operator presence lever 90 and the left operator presence lever 92 needs to be engaged in order to actuate the operator presence switch. However, both the right operator presence lever 90 and the left operator presence lever 92 can be engaged at the same time to actuate the operator presence switch. In other words, the operator presence switch can allow the engine 16 to operate when either or both the right operator presence lever 90 is moved toward the right drive lever 38 or the left operator presence lever 92 is moved toward the left drive lever 40.

Figure 9:
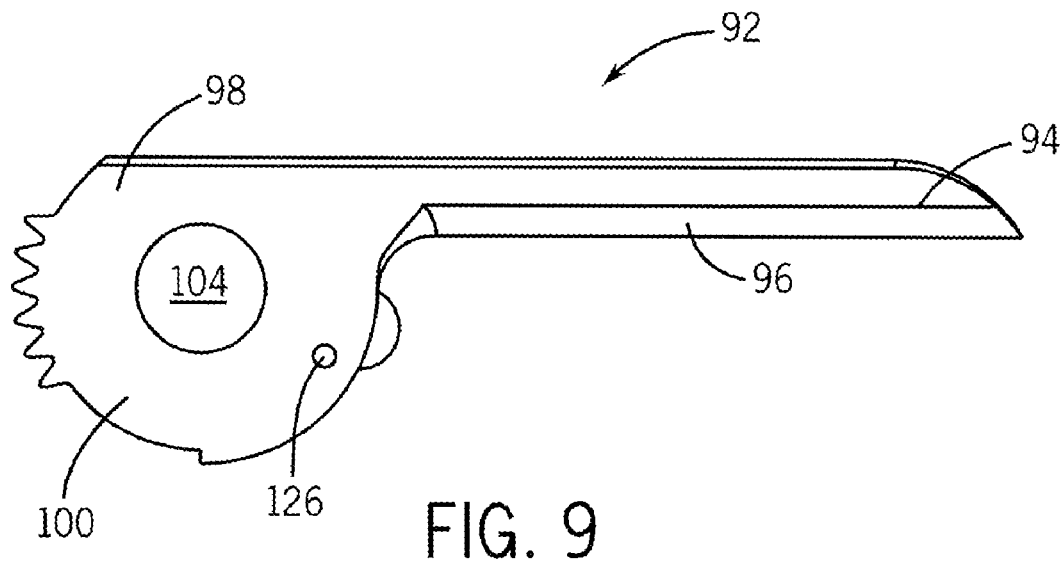
FIG. 9 is a front view of an operator presence lever for use with the control assembly of FIG. 1.
Figure 10:
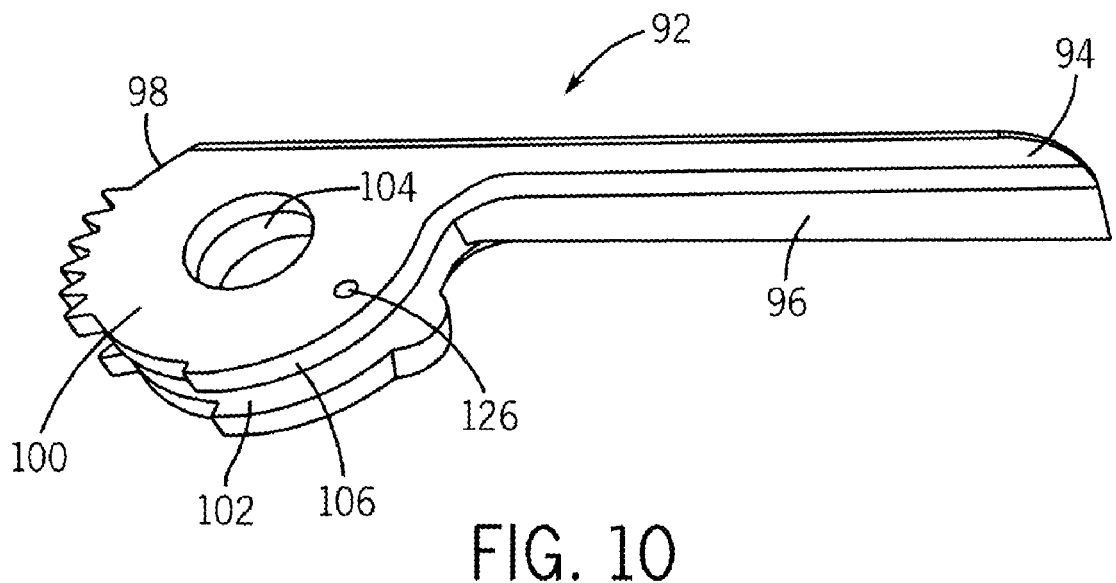
FIG. 10 is a perspective view of the operator presence lever of FIG. 9.

The right operator presence lever 90 and the left operator presence lever 92 can be substantially the same, with the left operator presence lever 92 being shown by way of example in FIGS. 9 and 10. The left operator presence lever 92 can include a first end 94, a grip 96, a second end 98, a first pivot plate 100, and a second pivot plate 102. The first pivot plate 100 and the second pivot plate 102 can define a pivot aperture 104 that can receive the first left axle 58, as shown in FIG. 2. The first pivot plate 100 and the second pivot plate 102 can be positioned to create a slot 106 to receive the pivot plate of the left drive lever 40.

As shown in FIGS. 2 and 3, the right operator presence lever 90 can be pivotably coupled along with the right drive lever 38 to the first right axle 56. Similarly, the left operator presence lever 92 can be pivotably coupled along with the left drive lever 40 to the first left axle 58.

As shown in FIG. 2, an operator presence linkage 118 can be used to transfer movement of the right operator presence lever 90 and the left operator presence lever 92 to the operator presence switch. The operator presence linkage 118 can include a cable 120 having a first end 122 coupled to a cable aperture 124 in the right operator presence lever 90. The cable 120 can extend between the right operator presence lever 90 and the left operator presence lever 92. The cable 120 can then be coupled through a cable aperture 126 in the left operator presence lever 92 (as shown in FIGS. 9 and 10) and to a bracket 128 (as shown in FIG. 2). The bracket 128 can be used to couple the remainder of the cable 120 to the operator presence switch. In some embodiments, as shown in FIG. 2, the bracket 128 can include a pin or boss 130 that can be received within a curved aperture 116 in a cover 108 (as described below) in order to limit the range of motion of the left operator presence lever 92, and thus the cable 120.

Figure 4:
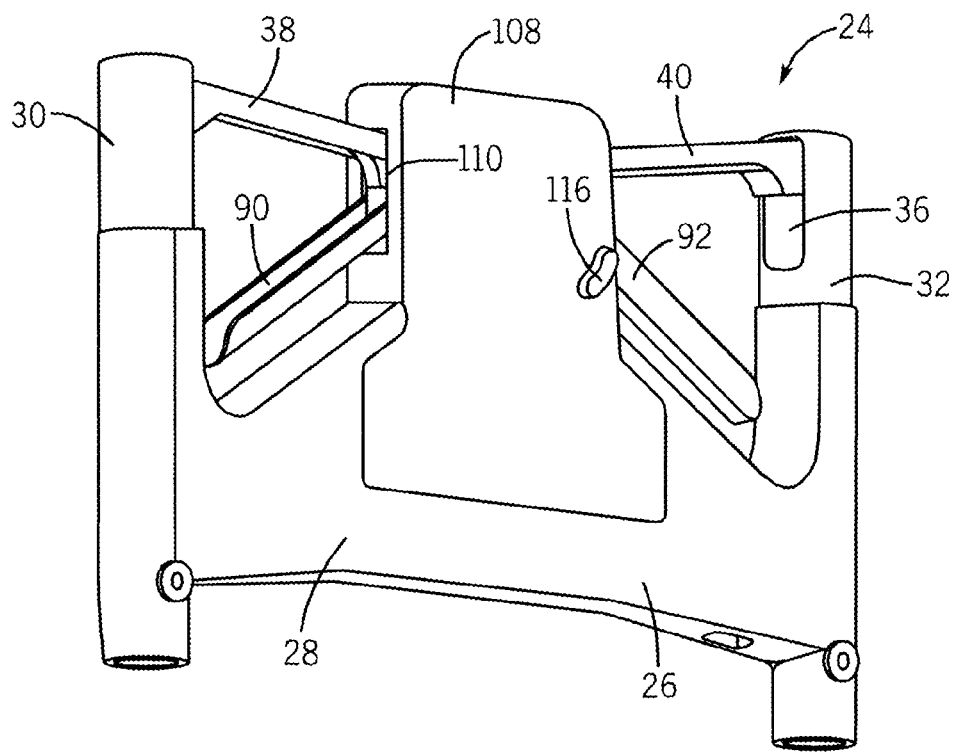
FIG. 4 is a perspective view of the control assembly of FIG. 2 including a cover.
Figure 5:
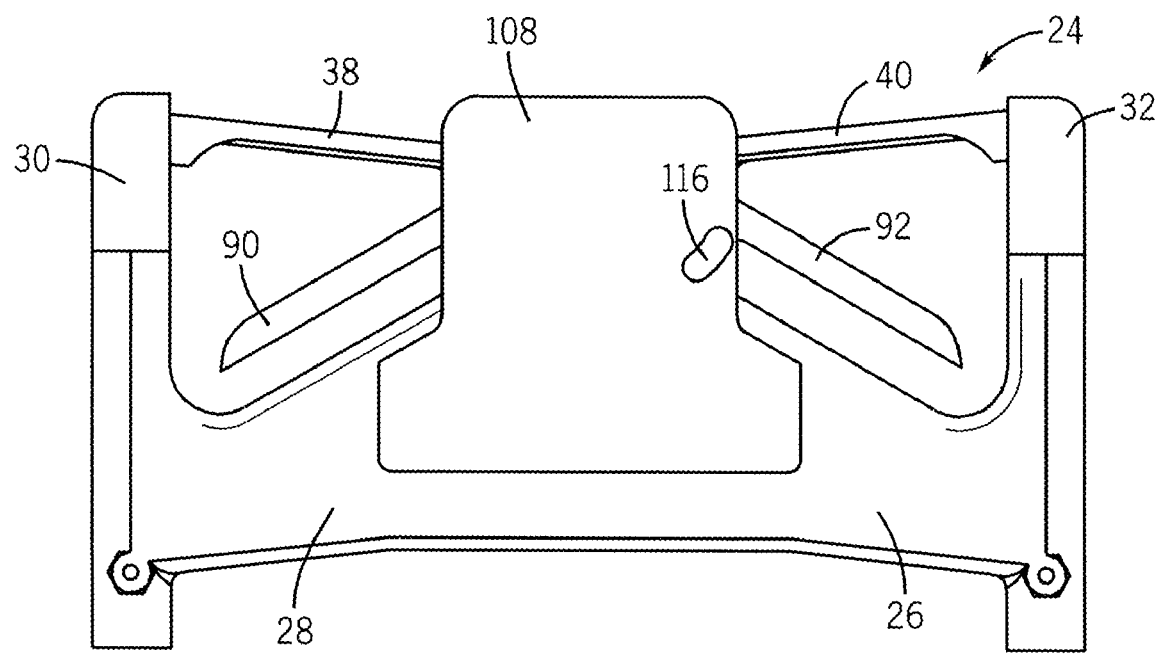
FIG. 5 is a front view of the control assembly of FIG. 4.

FIGS. 4 and 5 illustrate the control assembly 24 with a cover 108 positioned to protect the gears and pivots of the various levers. The cover 108 can be coupled to the control panel 26 in any suitable fashion. The cover 108 can include side openings 110 to allow the levers to have the appropriate range of motion.

Figure 6:
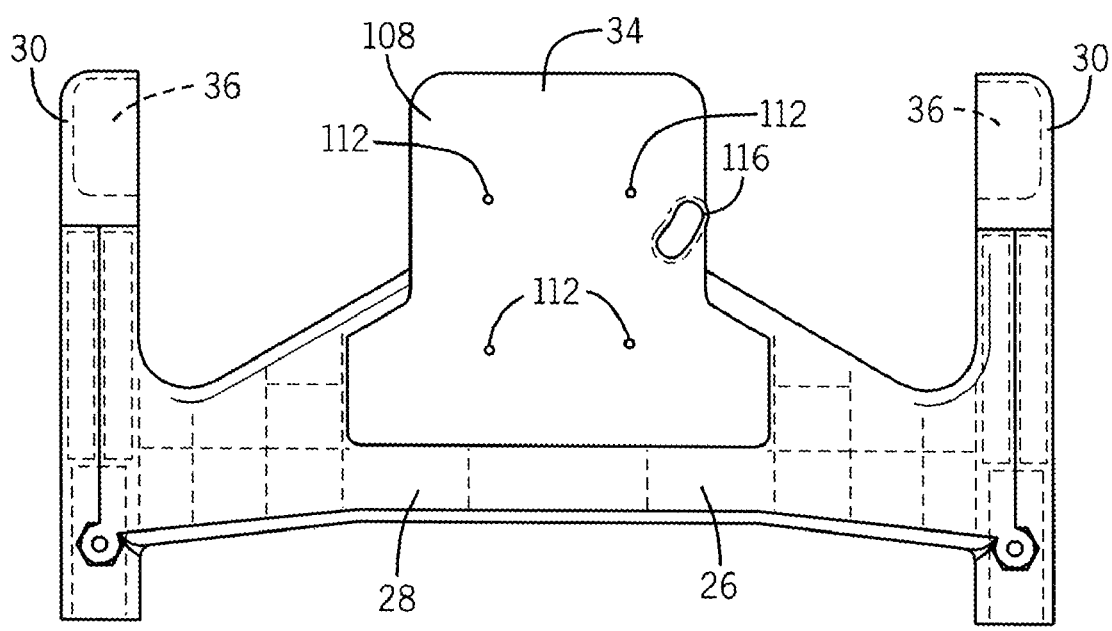
FIG. 6 is a front cross-sectional view of a control panel and the cover for use with the control assembly of FIG. 1.

FIG. 6 illustrates the control panel 26 including the base plate 28, the right lever support member 30, the left lever support member 32, the pivot support member 34, the drive lever receiving apertures 36, and the cover 108. The pivot support member 34 can include four holes 112 through which the axles 56, 58, 76, and 85 (as shown in FIG. 2) can be received. In some embodiments, the right drive lever 38 and the right operator presence lever 90 are pivotably coupled together to the pivot support member 34 and the left drive lever 40 and the left operator presence lever 92 are pivotably coupled together to the pivot support member 34.

Figure 7:
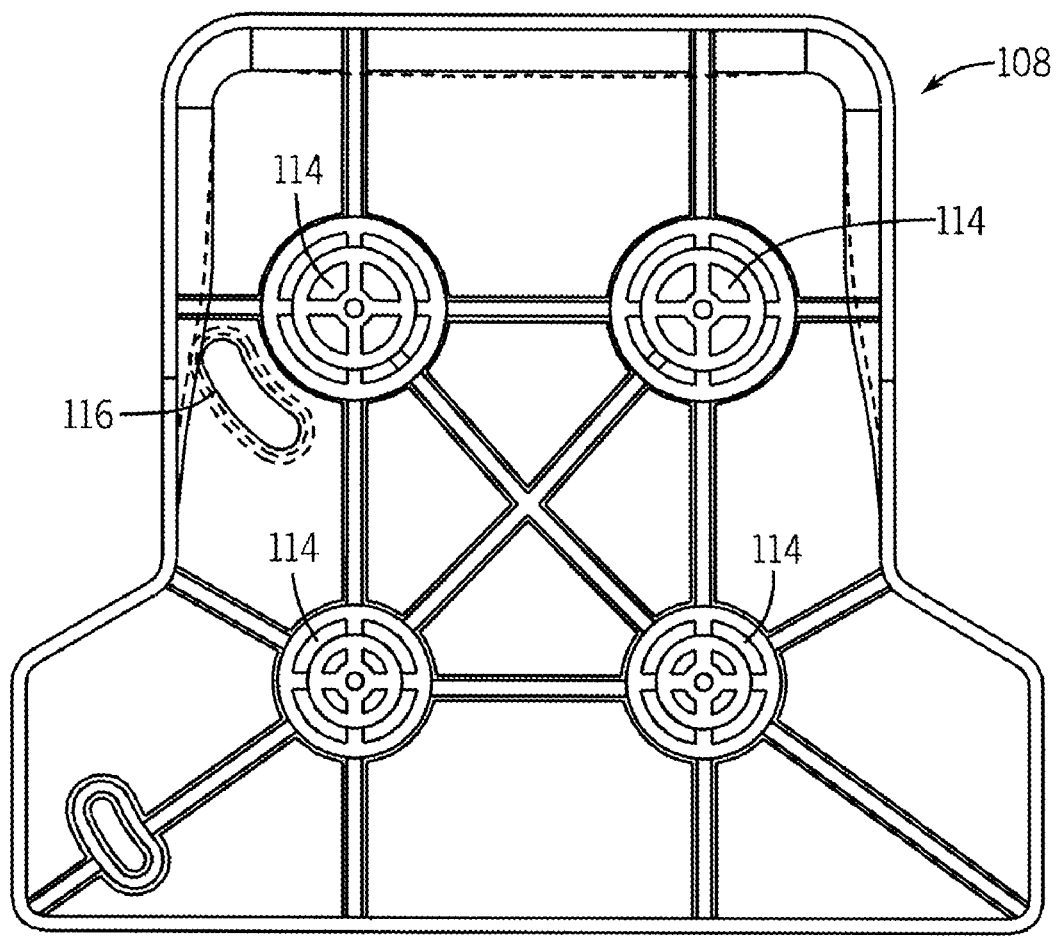
FIG. 7 is an interior view of a portion of the cover of FIG. 4 for use with the control panel of FIG. 6.

FIG. 7 illustrates an interior portion of the cover 108. The cover 108 can include pivot bosses 114 that can be used to secure a portion of the axles 56, 58, 76, and 85. In some embodiments, the cover 108 can include a curved aperture 116 that can receive the pin or boss 130 in order to limit the range of motion of the left operator presence lever 92, and thus the cable 120.

In some embodiments, as shown in FIGS. 2, 3, and 6, the base plate 28 can lie substantially within a control plane and the various levers of the control assembly 24 can move substantially within the control plane. For example, in one embodiment, the right drive lever 38, the left drive lever 40, the right operator presence lever 90, and the left operator presence lever 92 be positioned substantially within a single control plane. In some embodiments, movement of the right operator presence lever 90 and the left operator presence lever 92 can be rotational movement substantially within the control plane.

In some embodiments, the control assembly 24 can be operated in the following manner. The operator can squeeze together the left drive lever 40 and the left operator presence lever 92 or the right drive lever 38 and the right operator presence lever 90 in order to actuate the operator presence switch. The operator can start the engine after actuating the operator presence switch. The operator can control a speed of the transmission by applying pressure to one or both of the left drive lever 40 and the right drive lever 38 while squeezing one or both of the left operator presence lever 92 and the right operator presence lever 90. In some embodiments, the transmission can be a variable speed transmission that is engine driven or that includes one or more hydrostatic pumps. The speed of the variable speed transmission can be controlled through a cable connection or linkage with either one or both of the right drive lever 38 and the left drive lever 40. In this manner, the operator can control the speed of the mower 10 and actuate the operator presence switch with a single hand.

Figure 15:
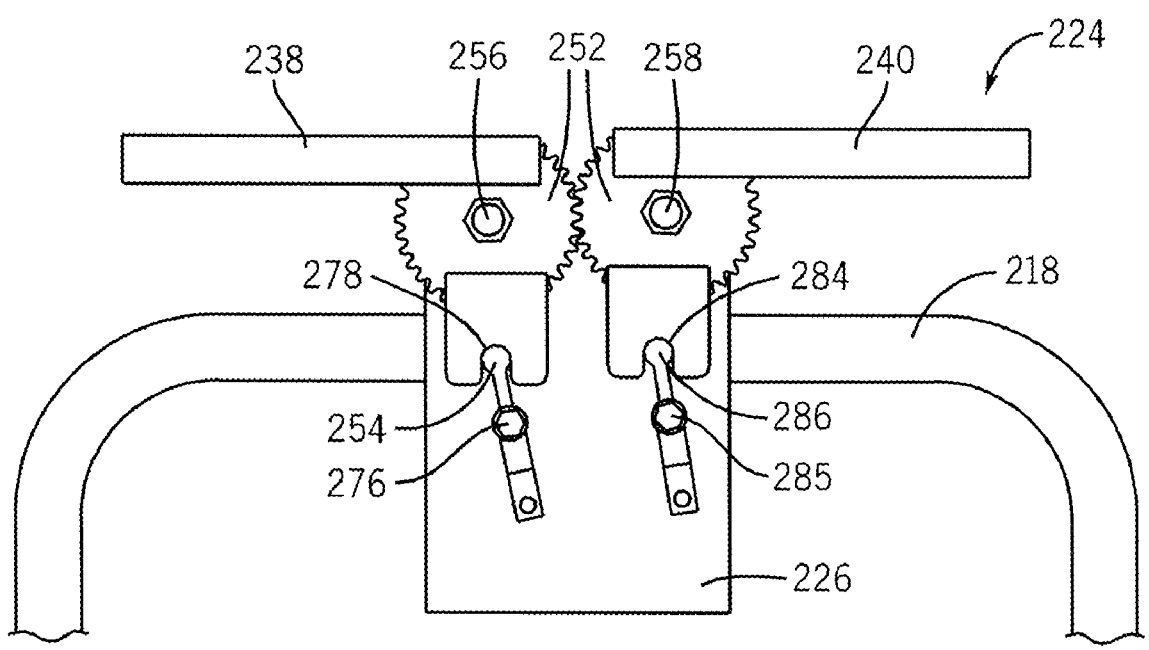
FIG. 15 is a front view of a drive portion of a control assembly according to another embodiment of the invention.

FIG. 15 is a front view of a drive lever portion of a control assembly 224 according to another embodiment of the invention. The control assembly 224 can be coupled to a handle support 218 in a suitable manner with or without a control panel. The control assembly 224 can include a right drive lever 238, a left drive lever 240, a right control member lobe 254, and a left control member lobe 286. The right drive lever 238 can include a lobe-receiving recess 278 to receive the right control member lobe 254. Similarly, the left drive lever 240 can include a lobe-receiving aperture 284 to receive the left control member lobe 286. The right drive lever 238 can pivot about a first right axle 256, which can cause the right control member lobe 254 to pivot about a second right axle 276. Similarly, the left drive lever 240 can pivot about a first left axle 258, which can cause the left control member lobe 286 to pivot about a second left axle 285. In this manner, either one of the right drive lever 238 and the left drive lever 240 can be used to control the speed of the transmission. In some embodiments, the right drive lever 238 and the left drive lever 240 can each include geared portions 252 in order to engage one another to provide additional stability. Rather than including the substantially oval control members of the embodiment shown in FIGS. 1-14, the control assembly 224 can include bar-like members for the right control member lobe 254 and the left control member lobe 286.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein.

Various features and advantages of the invention are set forth in the following claims.

The invention claimed is:

1. A control assembly for use with a walk-behind mower having a transmission and an engine electrically connected to an operator presence switch, the control assembly comprising:

a left drive lever and a right drive lever;

a left control member and a right control member, the left control member coupled to the left drive lever, the right control member coupled to the right drive lever, the left control member and the right control member each coupled to the transmission; and a left operator presence lever and a right operator presence lever, the left operator presence lever moveable toward the left drive lever, the right operator presence lever moveable toward the right drive lever, the left operator presence lever and the right operator presence lever each coupled to the operator presence switch, the operator presence switch allowing the engine to operate when at least one of the left operator presence lever is moved toward the left drive lever and the right operator presence lever is moved toward the right drive lever.

2. The control assembly of claim 1 and further comprising a control panel defining a control plane; and wherein the left drive lever and the right drive lever are positioned substantially within the control plane.

3. The control assembly of claim 2 wherein the left operator presence lever and the right operator presence lever are positioned substantially within the control plane; and wherein movement of the left operator presence lever and the right operator presence lever is rotational movement substantially within the control plane.

4. The control assembly of claim 1 and further comprising a first left axle coupled to the left drive lever and the left operator presence lever and a first right axle coupled to the right drive lever and the right operator presence lever.

5. The control assembly of claim 4 and further comprising a second left axle coupled to the left control member and a second right axle coupled to the right control member.

6. The control assembly of claim 1 wherein the left drive lever includes a left lobe received by a left recess in the left control member and the right drive lever includes a right lobe received by a right recess in the right control member.

7. The control assembly of claim 1 and further comprising a linkage coupled to the left control member and the right control member.

8. The control assembly of claim 7 wherein the linkage is a cable linkage.

9. The control assembly of claim 1 and further comprising an operator presence linkage coupled to the left operator presence lever and the right operator presence lever.

10. The control assembly of claim 9 wherein the operator presence linkage is a cable linkage.

11. The control assembly of claim 1 wherein the left drive lever is coupled to the right drive lever by a first geared connection.

12. The control assembly of claim 11 wherein the left operator presence lever is coupled to the right operator presence lever by a second geared connection.

13. The control assembly of claim 1 and further comprising a control panel including a left drive lever receiving aperture and a right drive lever receiving aperture.

14. The control assembly of claim 1 and further comprising a control panel including a pivot support member; wherein the left drive lever and the left operator presence lever pivot about a concentric axis.

15. A method of manufacturing a walk-behind mower, the method comprising:
   providing at least one of a left drive lever and a left operator presence lever configured to be squeezed together and a right drive lever and a right operator presence lever configured to be squeezed together in order to actuate an operator presence switch;
   electrically connecting the operator presence switch to an engine so that the engine starts after the operator presence switch is actuated; and
   coupling a transmission to at least one of the left drive lever and the right drive lever to control a speed of the transmission when pressure is applied to at least one of the left drive lever and the right drive lever and when at least one of the left operator presence lever and the right operator presence lever is squeezed.

16. The method of claim 15 and further comprising positioning at least one of the left drive lever and the right drive lever substantially within a control plane defined by a control panel.

17. The method of claim 16 and further comprising allowing at least one of the left operator presence lever and the right operator presence lever to move substantially within the control plane.

18. The method of claim 15 and further comprising allowing the left drive lever and the left operator presence control to pivot about a left axle and allowing the right drive lever and the right operator presence lever to pivot about a right axle.

19. The method of claim 15 and further comprising one of allowing a left control member to move by moving the left drive lever and allowing a right control member to move by moving the right drive lever in order to control the transmission.

20. The method of claim 15 and further comprising protecting ends of the left drive lever and the right drive lever with a portion of a control panel.

* * * * *